(12) United States Patent
Yonemura

(10) Patent No.: US 7,920,240 B2
(45) Date of Patent: Apr. 5, 2011

(54) LIQUID CRYSTAL DISPLAY DEVICE AND METHOD OF MANUFACTURING THE SAME

(75) Inventor: Koji Yonemura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 97 days.

(21) Appl. No.: 11/758,852

(22) Filed: Jun. 6, 2007

(65) Prior Publication Data

US 2007/0279572 A1    Dec. 6, 2007

(30) Foreign Application Priority Data

Jun. 6, 2006   (JP) .................................. 2006-157439

(51) Int. Cl.
*G02F 1/1333*   (2006.01)
*G02F 1/1343*   (2006.01)

(52) U.S. Cl. ......................................... 349/141; 349/138
(58) Field of Classification Search .................. 349/141, 349/138
See application file for complete search history.

(56) References Cited

U.S. PATENT DOCUMENTS

| | | | |
|---|---|---|---|
| 4,932,757 A * | 6/1990 | Hanyu et al. .................. | 349/138 |
| 5,066,109 A * | 11/1991 | Kuratate et al. ................. | 349/85 |
| 5,313,322 A * | 5/1994 | Takanashi et al. ............. | 349/187 |
| 6,798,476 B2 * | 9/2004 | Hanakawa et al. ............ | 349/113 |
| 6,850,311 B2 * | 2/2005 | Hasegawa et al. ............. | 349/187 |
| 6,900,859 B2 | 5/2005 | Matsumoto | |
| 2004/0046918 A1 * | 3/2004 | Song ............................. | 349/141 |
| 2004/0056998 A1 * | 3/2004 | Hoshino ........................ | 349/113 |
| 2005/0030461 A1 * | 2/2005 | Ono et al. ...................... | 349/141 |
| 2006/0023152 A1 * | 2/2006 | Ohta et al. ..................... | 349/141 |
| 2006/0092352 A1 * | 5/2006 | Lin ................................ | 349/110 |
| 2006/0262252 A1 | 11/2006 | Yonemura et al. | |

FOREIGN PATENT DOCUMENTS

| | | |
|---|---|---|
| CN | 1326180 A1 | 12/2001 |
| JP | 4-141623 | 5/1992 |
| JP | 7-110471 | 4/1995 |
| JP | 2002-139727 | 5/2002 |
| JP | 2005-202002 | 7/2005 |
| KR | 2002-0025758 | 4/2002 |

OTHER PUBLICATIONS

U.S. Appl. No. 12/490,785, filed Jun. 24, 2009, Yonemura, et al.
U.S. Appl. No. 12/772,428, filed May 3, 2010, Yonemura.

* cited by examiner

*Primary Examiner* — Mark A Robinson
*Assistant Examiner* — Michael Inadomi
(74) *Attorney, Agent, or Firm* — Oblon, Spivak, McClelland, Maier & Neustadt, L.L.P.

(57) ABSTRACT

A liquid crystal display device includes an electrode substrate having a pixel electrode and a counter electrode, a counter substrate placed opposite to the electrode substrate, a sealing material formed frame-like surrounding a display area to attach the electrode substrate and the counter substrate, and liquid crystals placed in a space created by the electrode substrate, the counter substrate and the sealing material. The liquid crystal display device also includes an overcoat layer formed on a surface of the counter substrate facing the liquid crystals and placed in the display area. An end of the overcoat layer is located on the inward side with respect to the outer end of the sealing material.

10 Claims, 4 Drawing Sheets

RELATED ART

RELATED ART

LIQUID CRYSTAL DISPLAY DEVICE AND METHOD OF MANUFACTURING THE SAME

BACKGROUND OF THE INVENTION

1. Field of the Invention

The present invention relates to a liquid crystal display device and a method of manufacturing the liquid crystal display device.

2. Description of the Related Art

An active matrix display is known as a liquid crystal display device technology which provides high-quality images. The active matrix display uses a field-effect thin film transistor (TFT) as a switching device of a pixel. The active matrix display has the features of thin profile, light weight and low power consumption and offers clear contrast and high-speed display. Therefore, the active matrix display is widely used as a monitor of portable computers, space-saving desktop computers and so on.

The creation of high-quality images requires improved viewing angle characteristics. As an effort to improve the viewing angle characteristics, an in-plane switching (IPS) active matrix liquid crystal display device is disclosed in Japanese Unexamined Patent Application Publication No. 2002-139727. The IPS active matrix liquid crystal display device uses a horizontal electric field that applies an electric field in the horizontal direction. However, in the IPS active matrix liquid crystal display device of the related art, "after-image" or "burn-in" effects occur to degrade the performance of the display. Specifically, when another display pattern is displayed after continuously displaying the same display pattern for a long time, the previous pattern remains persistently displayed together with the new pattern. Particularly, the after-image and burn-in effects can get worse if a display is stored for a long period of time during manufacture. The IPS active matrix liquid crystal display device thus has the problem of the occurrence of the after-image and burn-in effects.

The structure of an active matrix liquid crystal display device of a related art is described hereinafter with reference to FIG. 5. FIG. 5 is a cross-sectional view of an active matrix liquid crystal display device. As shown in FIG. 5, an electrode substrate 1 includes a pixel electrode and a plurality of other electrodes of a scan signal line, a video signal line and so on. A counter substrate 3 is placed opposite to the electrode substrate 1. The electrode substrate 1 and the counter substrate 3 are attached to each other by a sealing material 4. Liquid crystals 9 are interposed between the electrode substrate 1 and the counter substrate 3. The counter substrate 3 is coated with an overcoat layer 8 on the surface facing the electrode substrate 1. In the liquid crystal display device of a related art, the overcoat layer 8 spreads from a display area to the periphery of the panel, which is on the outward side of the sealing portion. The overcoat layer 8 is typically made of acrylic resin or epoxy resin. Thus, the overcoat layer 8 absorbs moisture over time at the portion in contact with the outside air, so that the moisture reaches the display area.

The overcoat layer 8 of the counter substrate 3 contains inorganic ion impurity and organic ion impurity. The inorganic ion impurity enters the overcoat layer 8 in the process of manufacture. The organic ion impurity is a by-product of the curing reaction during manufacture. Such impurity ion 13 is movable through the medium of the moisture which is absorbed from the outside air as above. If an electric field is applied externally in such a condition, the electric field is also oriented vertically to the counter substrate 3 as shown in FIG. 6. As a result, polarization occurs in the overcoat layer 8 as shown in FIG. 7. Due to the overcoat polarization, liquid crystals are aligned vertically with respect to the substrate surface, which causes the after-image and burn-in effects.

In view of the foregoing, it is an object of the present invention to provide a liquid crystal display device capable of providing high-quality display and a method of manufacturing the liquid crystal display device.

SUMMARY OF THE INVENTION

To this end, according to one aspect of the present invention, there is provided a liquid crystal display device including a first substrate including a pixel electrode and a counter electrode, a second substrate placed opposite to the first substrate, a sealing material formed frame-like surrounding a display area to attach the first substrate and the second substrate, liquid crystals placed in a space created by the first substrate, the second substrate and the sealing material, and an overcoat layer formed on a side of the second substrate facing the liquid crystals and placed in the display area, an end of the overcoat layer is located on an inward side with respect to an outer end of the sealing material.

The present invention provides a liquid crystal display device capable of providing high-quality display and a method of manufacturing the liquid crystal display device.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENT OF THE INVENTION

First Embodiment

Figure 1:
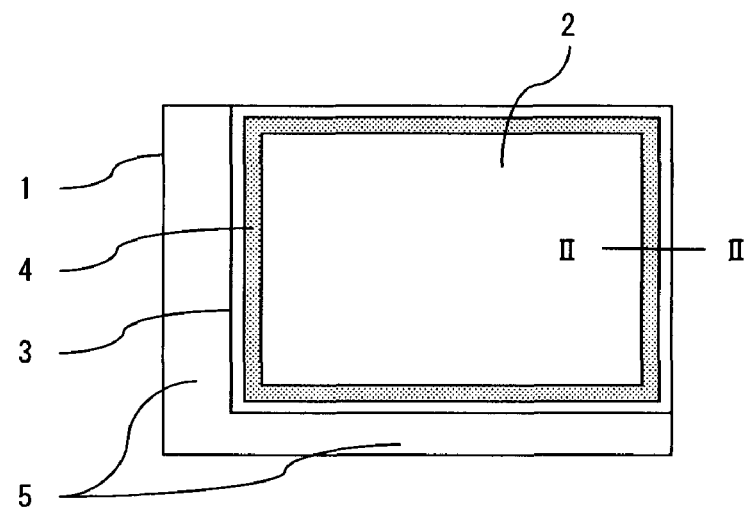
FIG. 1 is a schematic top plan view of a liquid crystal display device according to a first embodiment of the present invention.
Figure 2:
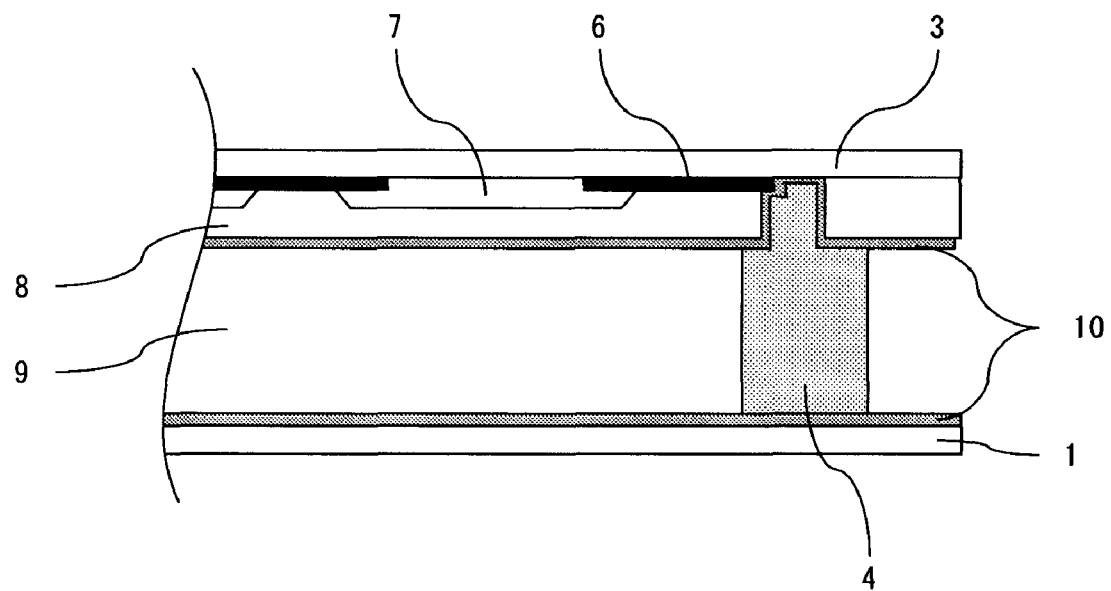
FIG. 2 is a cross-sectional view along line II-II in FIG. 1.
Figure 6:
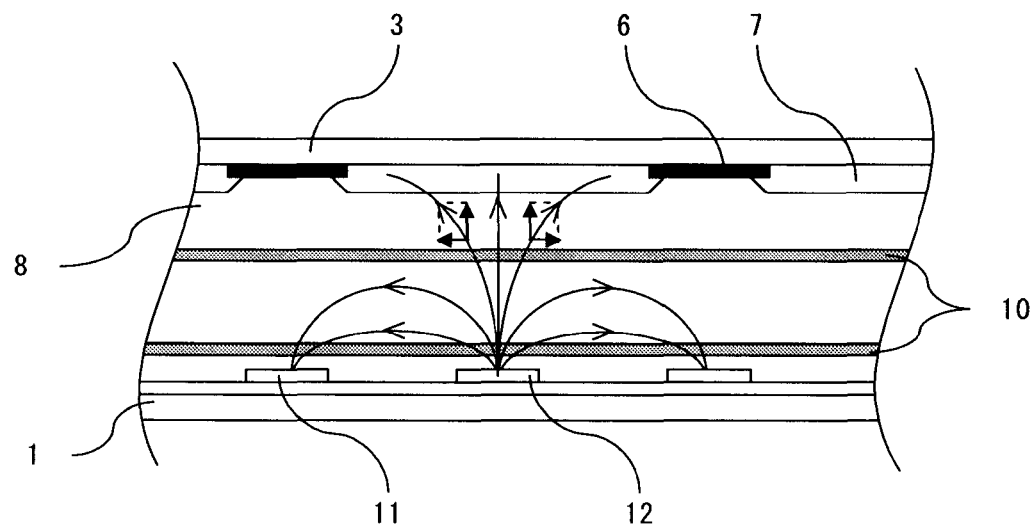
FIG. 6 is a view showing the orientation of electric fields in an IPS liquid crystal display device when driving the liquid crystals.
Figure 7:
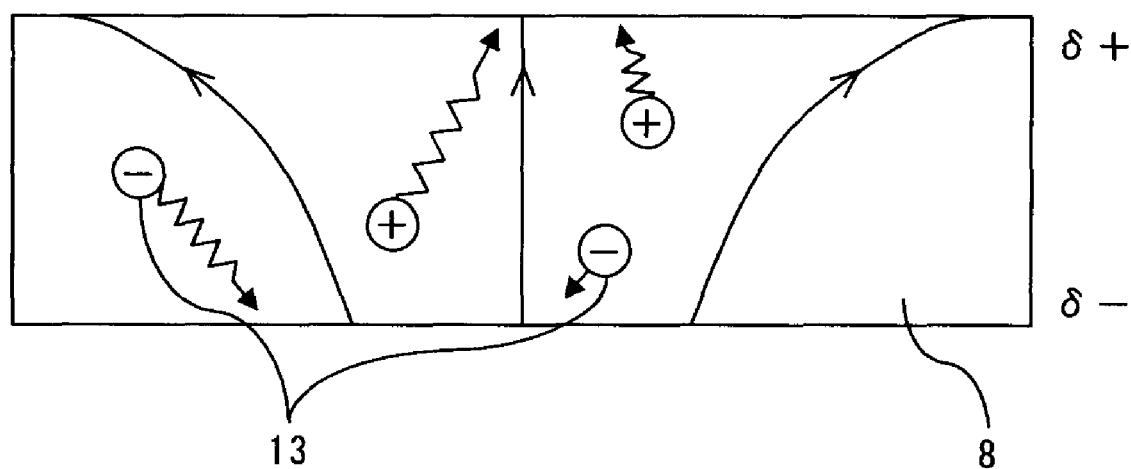
FIG. 7 is a view showing the polarization which occurs in the overcoat layer in FIG. 6.

A first embodiment of the present invention is described hereinafter with reference to FIGS. 1 and 2. FIG. 1 is a schematic top plan view of a liquid crystal display device according to the first embodiment of the present invention, and FIG. 2 is a cross-sectional view along line II-II in FIG. 1. The liquid crystal display device of this embodiment is an IPS mode liquid crystal display device in which a pixel electrode 11 and a counter electrode 12 are formed on an electrode substrate 1 as shown in FIG. 6.

Referring to FIG. 1, the electrode substrate 1 includes a pixel electrode where a display area 2 is created. The electrode substrate 1 also includes a scan signal line and a video signal line. A gate insulating film is placed between the scan signal line and the video signal line. A thin film transistor (TFT), which serves as a switching device, is placed in close proximity to each intersection of the scan signal line and the video signal line. Thus, TFTs are arranged in an array within the display area 2. A TFT includes a drain electrode and a source electrode, which are formed in the same layer as the video signal line. The source electrode and the drain electrode are connected through a semiconductor layer. The video signal line and the comb-shaped pixel electrode 11 are connected through the TFT. Accordingly, if the TFT is turned ON in response to a scan signal, a video signal is supplied from the video signal line to the pixel electrode. Further, the pixel electrode 11 is placed opposite to a comb-shaped counter electrode 12. The electrode substrate 1 is thus configured as a TFT array substrate.

The electrode substrate 1 is placed opposite to a counter substrate 3. The electrode substrate 1 and the counter substrate 3 have a frame-like sealing material 4 which is formed to surround the display area 2. The electrode substrate 1 and the counter substrate 3 are attached with each other by the sealing material 4. Further, liquid crystals 9 are interposed between the electrode substrate 1 and the counter substrate 3. Specifically, the liquid crystals 9 are placed in the space which is created by the electrode substrate 1, the counter substrate 3 and the sealing material 4. The electrode substrate 1 and the counter substrate 3 may be transparent insulating substrates such as a glass substrate and a quartz glass. The sealing material 4 may be made of photocurable, thermosetting acrylic resin or epoxy resin. Although not shown, a driver for supplying signals to the pixel electrode is mounted in a driver mounting area 5.

Referring next to FIG. 2, a black matrix 6, which is made of pigment or metal such as chrome, is placed on the surface of the counter substrate 3 facing the electrode substrate 1. The black matrix 6 shields light. A color material 7 is placed to fill the space between the black matrixes 6. The color material 7 is made of pigment or dye. The color material 7 may be a color filter of red (R), green (G) and blue (B). Further, an overcoat layer 8 is placed to cover the black matrix 6 and the color material 7. Furthermore, an alignment layer 10 is placed all over the surfaces of the electrode substrate 1 and the counter substrate 3 which are in contact with the liquid crystals 9. In this embodiment, the overcoat layer 8 which extends from the display area 2 ends at the sealing material 4 and is thus separated from the overcoat layer 8 which is placed in the peripheral area. In other words, the end of the overcoat layer 8 is located on the inward side with respect to the outer end of the sealing material 4.

A method of manufacturing the liquid crystal display device according to the first embodiment of the present invention is described hereinbelow. First, a plurality of electrodes such as a pixel electrode, and a gate line, which serves as the scan signal line, and a source line, which serves as the video signal line, are formed on a glass substrate. The electrodes on the electrode substrate 1 are formed by photolithography. The source line is made of 0.2 μm of amorphous silicon, 0.1 μm of Cr, and 0.3 μm of Al. The gate insulating film is made of 0.4 μm of SiN, and the pixel electrode is made of 0.1 μm of Cr. Further, the alignment layer 10 (AL 1044, available from Japan Synthetic Rubber Co., Ltd.) with the thickness of 0.07 μm is formed on the electrode substrate 1. The alignment layer 10 is formed by transfer method. Then, heat is applied using an oven at 180° C. so that the alignment layer 10 is cured. After that, the cured alignment layer 10 is rubbed. The rubbing is performed using a roller with a nylon rubbing cloth. The electrode substrate 1 of an IPS liquid crystal display device which applies an electric field horizontally with respect to the substrate surface is thereby produced. Then, spacers (KSE spacer with the diameter of 4.0±0.2 μm, available from Natoco Paint Co. Ltd.) are dispersed on the substrate. The distribution density of the spacers is 300/cm$^2$ (variation from 200 to 300/cm$^2$) on average.

After that, the black matrix 6 and the color material 7 are formed on another glass substrate. The black matrix 6 and the color material 7 are formed by photolithography. The black matrix 6, which shields light, is made of pigment or metal such as chrome. The color material 7 is made of pigment or dye. Then, the overcoat layer 8 pattern is created by mask patterning with photolithography. The overcoat layer 8 may be formed using NN 701 available from JSR Corporation. A part of the overcoat layer 8 is removed frame-like in the area of the sealing material 4, so that the overcoat layer 8 on the inward side of the sealing material 4 and the overcoat layer 8 on the outward side of the sealing material 4 are separated from each other. The overcoat 8 in the display area 8 thereby ends at the sealing material 4.

On this substrate, the alignment layer 10 (AL 1044, available from Japan Synthetic Rubber Co., Ltd.) is formed with the thickness of 0.07 μm. Then, heat is applied using an oven at 180° C., so that the alignment layer 10 is cured. After that, the cured alignment layer 10 is rubbed to thereby produce the counter substrate 3. Further, the sealing material 4 is applied to the periphery of the surface of the counter substrate 3 having the alignment layer 10. The sealing material 4 may be applied by dispenser. The two substrates are attached to each other by the sealing material 4. The sealing material 4 may be an epoxy adhesive. The sealing material 4 is applied frame-like in such a way that the sealing material 4 covers the outer circumference of the overcoat layer 8 which is placed in the display area 2. After that, the electrode substrate 1 and the counter substrate 3 are placed opposite to each other so that each pixel electrode area on the electrode substrate 1 and each color material 7 on the counter substrate 3 face each other. Then, thermocompression bonding is performed by applying the pressure of 0.5 kgf/cm$^2$ and the heat of 150° C. to the whole substrate to thereby cure the sealing material 4. Finally, the liquid crystals 9 are filled between the substrates by decompression and the substrates are sealed together.

As described above, the end of the overcoat layer 8 which extends from the display area 2 is located on the inward side with respect to the outer end of the sealing material 4. Therefore, the end of the overcoat layer 8 which extends from the display area 2 is separated from the overcoat layer 8 which is placed in the periphery. This prevents the overcoat layer 8 in the liquid crystal area from coming in contact with the outside air, which reduces the moisture absorption. Because the ion movement occurs through the medium of moisture, the polarization in the overcoat layer 8 does not happen in this structure, which avoids the burn-in effects and thereby improves the display quality.

Second Embodiment

Figure 3:
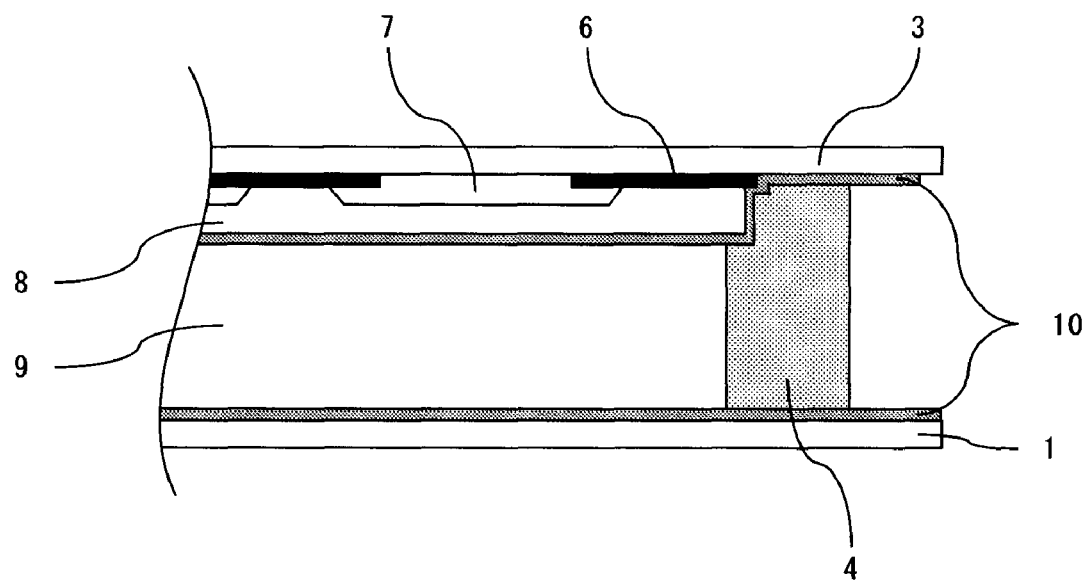
FIG. 3 is a cross-sectional view of a liquid crystal display device according to a second embodiment of the present invention.

A second embodiment of the present invention is described hereinafter with reference to FIG. 3. FIG. 3 is a cross-sectional view of a liquid crystal display device according to the second embodiment. In this embodiment, the structure of the overcoat layer 8 is different from that of the first embodiment. The other structure is the same as in the first embodiment and the description is not repeated herein. A manufacturing method of the liquid crystal display device of the second embodiment is the same as that of the first embodiment and thus not described herein.

In FIG. 3, the same elements as in FIGS. 1 and 2 are denoted by the same reference numerals. A difference from the first embodiment is as follows. In the structure of FIG. 3, the overcoat layer 8 is placed only on the inward side with respect to the outer side of the sealing material 4. Specifically, the end of the overcoat layer 8 which extends from the display area 2 is located on the inward side with respect to the outer end of the sealing material 4, and the overcoat layer 8 in the periphery is removed. Therefore, the overcoat layer 8 is not placed on the outward side with respect to the outer end of the sealing material 4. In this embodiment, the overcoat layer 8 which is on the outward side of the sealing material 4 is entirely removed in the process of creating the pattern of the overcoat layer 8.

As described above, the end of the overcoat layer 8 which extends from the display area 2 is located on the inward side with respect to the outer end of the sealing material 4. Further, the overcoat layer 8 which is in the peripheral area is removed in this embodiment. This prevents the overcoat layer 8 in the liquid crystal area from coming in contact with the outside air, which reduces the moisture absorption just like in the first embodiment. Because the ion movement occurs through the medium of moisture, the polarization in the overcoat layer 8 does not happen in this structure, which avoids the burn-in effects and thereby improves the display quality.

Third Embodiment

Figure 4:
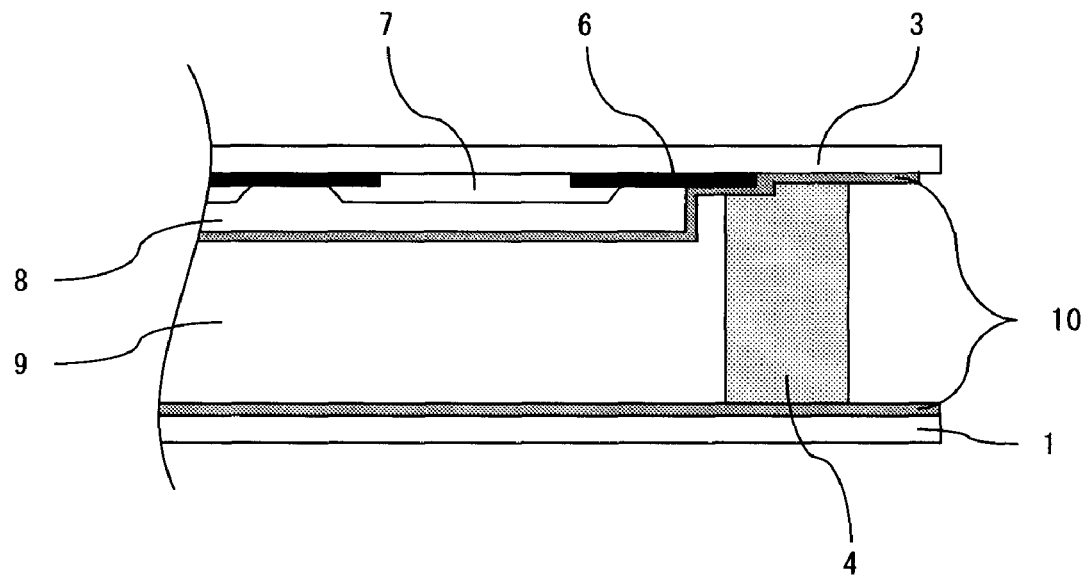
FIG. 4 is a cross-sectional view of a liquid crystal display device according to a third embodiment of the present invention.
Figure 5:
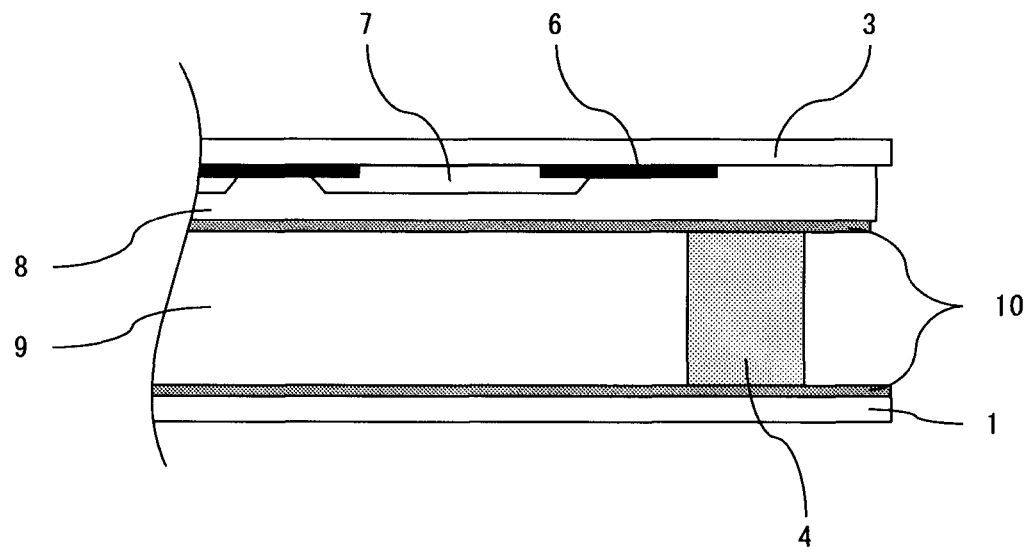
FIG. 5 is a cross-sectional view of a liquid crystal display device according to a related art.

A third embodiment of the present invention is described hereinafter with reference to FIG. 4. FIG. 4 is a cross-sectional view of a liquid crystal display device according to the third embodiment. In this embodiment, the structure of the overcoat layer 8 is different from that of the first and second embodiments. The other structure is the same as in the first and second embodiments and the description is not repeated herein.

In FIG. 4, the same elements as in FIGS. 1 and 2 are denoted by the same reference numerals. The third embodiment shown in FIG. 4 is different from the first and second embodiments in that the overcoat layer 8 is placed on the inward side with respect to the inner side of the sealing material 4. Thus, the end of the overcoat layer 8 is located on the inward side with respect to the inner end of the sealing material 4. Therefore, the overcoat 8 is not placed at the sealing material 4.

A method of manufacturing the liquid crystal display device according to the third embodiment is described hereinafter. In this embodiment, the structure of the overcoat layer 8 is different from that of the first and second embodiments. The sealing material 4 is applied frame-like on the outward side with respect to the outer end of the overcoat layer 8 which is placed in the display area 2. Thus, the sealing material 4 is not overlapped with but is separated from the overcoat layer 8 which extends from the display area 2. The manufacturing method is the same as that of the first and second embodiments except for the place to form the sealing material 4, and the redundant description is not provided herein.

As described above, the end of the overcoat layer 8 is located on the inward side with respect to the inner end of the sealing material 4. This prevents the overcoat layer 8 in the liquid crystal area from coming in contact with the outside air, which reduces the moisture absorption just like in the first and second embodiments. Because the ion movement occurs through the medium of moisture, the polarization in the overcoat layer 8 does not happen in this structure, which avoids the burn-in effects and thereby improves the display quality.

Although the overcoat layer 8 is placed only on the inward side with respect to the inner side of the sealing material 4 in FIG. 4, the present invention is not limited to this structure. For example, the overcoat layer 8 which is placed on the outward side with respect to the inner side of the sealing material 4 may exist. Other structures are possible as long as the overcoat layer 8 which is placed on the inward side with respect to the inner side of the sealing material 4 is separated from the overcoat layer 8 which is placed on the outward side with respect to the inner side of the sealing material 4. In this embodiment, the parts of the overcoat layer 8 which is overlapped with the sealing material 4 and which is placed outside of the sealing material 4 are entirely removed in the process of creating the pattern of the overcoat layer 8.

A method of evaluating the liquid crystal display device according to the first to third embodiments is described hereinbelow. After producing a liquid crystal panel as described above, the evaluation against the burn-in effects is performed. Specifically, after the same pattern is displayed for two hours, it is replaced by a halftone pattern, and the visibility of the display pattern which has been displayed is checked. The burn-in effects do not occur in the liquid crystal display device according to the first to third embodiments.

However, due to production reasons, the counter substrate 3 can be left in the air for a certain period of time after it is produced until a liquid crystal panel is produced. The evaluation against the burn-in effects on the panel which includes such a counter substrate 3 results in that the burn-in occurs. Even with the structure of the first to third embodiments, the overcoat layer 8 in the display area 2 absorbs moisture from the atmosphere during the period when it is left in the air. This causes the occurrence of the burn-in effects. To avoid this, heat treatment or low-pressure heat treatment is performed on a pair of the electrode substrate 1 and the counter substrate 3 which are attached together prior to the filling of liquid crystals.

By adding the step of performing heat treatment or low-pressure heat treatment on the attached pair of the electrode substrate 1 and the counter substrate 3 prior to the filling of liquid crystals, it is possible to remove the moisture which is absorbed into the overcoat layer 8. Because the movement of ion is enabled through the medium of moisture, the polarization in the overcoat layer 8 does not happen in this structure. As a result, the burn-in effects do not occur and the display quality is improved accordingly.

The correlation between the specific resistance of the overcoat layer 8 and the burn-in effect is described hereinafter with reference to Tables 1 and 2.

TABLE 1

| OVERCOAT LAYER | BEFORE MOISTURE ABSORPTION | AFTER MOISTURE ABSORPTION |
| --- | --- | --- |
| A | $1 * 10^{16} \, \Omega \, cm$ | $7 * 10^{14} \, \Omega \, cm$ |
| B | $1 * 10^{16} \, \Omega \, cm$ | $1 * 10^{15} \, \Omega \, cm$ |
| C | $2 * 10^{16} \, \Omega \, cm$ | $7 * 10^{15} \, \Omega \, cm$ |

Table 1 shows a difference in the specific resistance of the overcoat layers A, B and C before and after the moisture absorption at high (85° C.) temperature, high (85%) humidity conditions for several days. In this example, the evaluation is performed on the specific resistance of the overcoat layers A, B and C at the frequency of 0.1 mHz.

TABLE 2

| OVERCOAT LAYER | BEFORE MOISTURE ABSORPTION | AFTER MOISTURE ABSORPTION |
|---|---|---|
| A | ⊚ | X |
| B | ⊚ | ○ |
| C | ⊚ | ⊚ |

⊚: Very good (not visible)
○: Good (scarcely visible)
X: Bad (visible)

Table 2 shows a result of visual check on the burn-in effect in the overcoat layers A, B and C before and after the moisture absorption under the high temperature, high humidity conditions. In this evaluation on the burn-in effects, a halftone pattern is displayed after the same pattern is displayed for two hours, and the visibility of the display pattern which has been displayed is checked.

From the results of Tables 1 and 2, the specific resistance of the overcoat layer should be $1.0*10^{16}$ Ωcm or higher at the frequency of 0.1 mHz in order to reduce the burn-in effects.

As described earlier, the heat treatment at the room temperature of 25° C. or higher is performed on the attached pair of the electrode substrate 1 and the counter substrate 3 prior to the filling of liquid crystals, thereby removing the moisture absorbed into the overcoat layer. This allows the specific resistance of the overcoat layer to be $1.0*10^{16}$ Ωcm or higher at the frequency of 0.1 mHz, which reduces the burn-in effects. The heat treatment may be performed under subatmospherical pressure of 133.3 Pa (=1 Torr) or less in order to enhance the desorption of moisture. This enables the improvement of the display quality.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A liquid crystal display device of an in-plane switching mode, comprising:
    a first substrate including a pixel electrode and a counter electrode, the pixel electrode and the counter electrode being configured to apply an electric field in a direction parallel to the surface of the first substrate;
    a second substrate placed opposite to the first substrate;
    a sealing material surrounding a display area to attach the first substrate and the second substrate;
    liquid crystals placed in a space created by the first substrate, the second substrate and the sealing material; and
    an overcoat layer formed on a side of the second substrate facing the liquid crystals so as to directly contact an alignment layer over the entire display area, the alignment layer being configured to align the liquid crystals, wherein
    an end of the overcoat layer is located on an inward side with respect to an outer end of the sealing material, and the overcoat layer has a specific resistance of $1.0*10^{16}$ Ωcm or higher at a frequency of 0.1 mHz.

2. A method of manufacturing a liquid crystal display device of an in-plane switching mode, comprising:
    forming a pixel electrode and a counter electrode on a first substrate, the pixel electrode and the counter electrode being configured to apply an electric field in a direction parallel to the surface of the first substrate;
    forming an overcoat layer on a second substrate, the overcoat layer having a specific resistance of $1.0*10^{16}$ Ωcm or higher at a frequency of 0.1 mHz;
    forming a sealing material on the first substrate or the second substrate so as to surround a display area;
    forming an alignment layer on the overcoat layer so as to directly contact the overcoat layer over the entire display area, the alignment layer being configured to align liquid crystals; and
    attaching the first substrate and the second substrate by the sealing material with an end of the overcoat layer being located on an inward side with respect to an outer end of the sealing material and interposing the liquid crystals between the first substrate and the second substrate.

3. The method of manufacturing a liquid crystal display device according to claim 2, further comprising:
    performing heating at a temperature of 25° C. or higher after attaching the first substrate and the second substrate and before interposing the liquid crystals to reduce moisture absorption of the overcoat layer.

4. The method of manufacturing a liquid crystal display device according to claim 3, wherein
    the heating is performed under subatmospherical pressure conditions.

5. The liquid crystal display device according to claim 1, wherein
    the alignment layer is disposed between the sealing material and the second substrate.

6. The method of manufacturing a liquid crystal display device according to claim 2, wherein
    the forming the alignment layer step comprises forming the alignment layer such that the alignment layer is disposed between the sealing material and the second substrate in the liquid crystal display device.

7. The liquid crystal display device according to claim 1, wherein
    the alignment layer contacts all surfaces of the overcoat layer facing the liquid crystals.

8. The method of manufacturing a liquid crystal display device according to claim 2, wherein
    the forming the alignment layer step comprises forming the alignment layer such that the alignment layer contacts all surfaces of the overcoat layer facing the liquid crystals in the liquid crystal display device.

9. The liquid crystal display device according to claim 1, wherein the overcoat layer is formed so as to contact a color filter disposed on the second substrate.

10. The method of manufacturing a liquid crystal display device according to claim 2, wherein
    the forming the overcoat layer step comprises forming the overcoat layer on a color filter disposed on the second substrate.

* * * * *